United States Patent Office 3,687,876
Patented Aug. 29, 1972

3,687,876
POLYURETHANE FOAMS STABILIZED WITH
6-HYDROXY CHROMANS
Roland Nast, Cologne-Buchheim, Manfred Dahm, Bergisch-Neukirchen, and Kurl Ley, Leverkusen, Germany, assignors to Farbenfabriken Bayer Aktiengesellschaft, Leverkusen, Germany
No Drawing. Filed Sept. 4, 1970, Ser. No. 69,944
Claims priority, application Germany, Sept. 6, 1969,
P 19 45 212.1
Int. Cl. C08g 22/44, 51/58
U.S. Cl. 260—2.5 BB                        6 Claims

ABSTRACT OF THE DISCLOSURE

A process is provided for the production of polyurethane foams from polyisocyanates, organic compounds which contain at least two active hydrogen atoms, blowing agents, catalysts, substances which prevent discoloration in the core of the foam and, if desired, other additives, wherein discoloration preventative is a 6-hydroxy-chroman of the general formula:

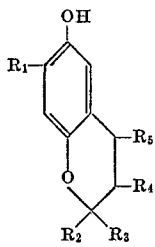

in which $R_1$ is hydrogen, an alkyl radical, a cycloalkyl radical or an aralkyl radical containing from one to 9 carbon atoms, and $R_2$, $R_3$, $R_4$ and $R_5$ are the same or different hydrogen or lower alkyl group having from one to 4 carbon atoms.

---

Foams with a very wide variety of physical properties have long been produced commercially using the isocyanate polyaddition process in which compounds containing several active hydrogen atoms, particularly hydroxyl and/or carboxyl groups, are reacted with polyisocyanates, if desired with the addition of water, activators, emulsifiers, foam stabilizers and other additives (see R. Vieweg, A. Hochtlen, Kunstoff-Handbuch, volume VII, Polyurethane, Hanser Munchen, 1966). By choosing the appropriate reaction components, both elastic and rigid foams as well as intermediate type foams can thus be obtained.

Foams prepared from polyisocyanates are preferably produced by mixing liquid components. The compounds to be reacted with each other are either added together in a one-shot process or an NCO-containing prepolymer is first prepared by reacting a polyhydroxyl compound, such as a polyalkylene glycol ether or hydroxyl-containing polyester, with an excess of polyisocyanate, and the prepolymer is then converted into a foam with water or any other suitable blowing agent in a second reaction stage.

During the foaming process, unwanted discolorations occur in the block of the foam, particularly when producing foams having low bulk densities or when a comparatively large quantity of isocyanate is used, and a yellow to brown color is generally observed at the center of the block of foam where the temperature increase due to the heat of reaction is highest. The discoloration of the foam is often made worse by the components of the reaction mixture including tertiary amines which are used as catalysts, amino-containing polyethers and various metal compounds which may be present as impurities, e.g. compounds of iron, copper, nickel or cobalt. Halogenated compounds such as those frequently used as blowing agents may also have a certain influence on the occurrence of such discolorations as may other additives including, for example, flame-proofing agents such as tris-β-chloroethylphosphate.

Attempts have been made to prevent the unwanted discoloration in the core of a foam by the addition of nitro-containing or nitroso-containing compounds of 2,6-ditertiary butyl-p-cresol or, as described in German Auslegeschrift No. 1,282,973, by the addition of phenothiazine.

The addition of nitro and/or nitroso compounds is disadvantageous, however, since these compounds are physiologically harmful. Moreover, these compounds, as well as phenothiazine, cause an undesirable yellow or pink discoloration of the foams. Furthermore, 2,6-di-tertiary butyl-p-cresol is only of very limited effectiveness.

It is therefore an object of this invention to provide improved polyurethane foams and a process for preparing them which are devoid of the foregoing disadvantages.

Another object of this invention is to provide polyurethane foams which are free from discolorations and a process for preparing them.

Another object of this invention is to provide polyurethane foams which are free from discoloration and have low bulk densities or are prepared from comparatively large quantities of isocyanate and a process for preparing them.

Yet another object of this invention is to provide polyurethane foams which are free from discoloration even when tertiary amines, amino polyethers, various metal compounds, halogenated compounds and other additives are included as components of the reaction mixture and a process for preparing them.

The foregoing objects and others which will become apparent from the following description are accomplished in accordance with this invention, generally speaking, by providing polyurethane foams which are free from discoloration and a method for producing them by reacting organic polyisocyanates, organic compounds containing at least two hydrogen atoms reactive with NCO groups, blowing agents and any desired catalysts or additives and including in the reaction mixture 6-hydroxy-chromans having the general formula:

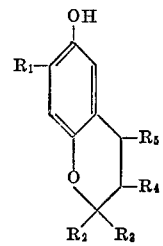

wherein $R_1$ is a hydrogen atom or an alkyl radical, a cycloalkyl or an aralkyl radical containing from one to 9 carbon atoms and $R_2$, $R_3$, $R_4$ and $R_5$ may be the same or different hydrogen atom or lower alkyl group, preferably having one to 4 carbon atoms and most preferably a methyl group.

It has now been found that undesirable discolorations which often occur in polyurethane foams can be prevented if the isocyanate polyaddition reaction is carried out in the presence of 6-hydroxy-chromans or certain substitution products of 6-hydroxy-chromans. The action of 6-hydroxy-chromans is probably due to the fact that they prevent reactions with free radicals which presumably cause the discolorations in the interior of the blocks of foam. Since free radicals are particularly readily produced by treatment with oxygen, the effectiveness of the 6-hydroxy-chromans can be checked by determining the time after which oxygen uptake takes place. At that point, the stabilizer has been used up and this length of time is a direct measure of the effectiveness of the substance.

The 6-hydroxy-chromans are advantageously used in an amount of 0.001 to 5% by weight, preferably 0.02 to 3.0% by weight, based on the weight of the reaction mixture.

During the preparation of the foam product, the stabilizers of this invention may be incorporated into one of the reactants, e.g. the polyol or the organic polyisocyanate, or they may be added separately to the reaction mixture in the form of a highly concentrated solution in a suitable solvent. For technical reasons, it is especially advantageous in practice to incorporate the 6-hydroxy-chromans directly into the polyol or the polyisocyanate after the preparation of the polyol or polyisocyanate respectively. In order to prevent unwanted discoloration from occurring in the polyol in which the 6-hydroxy-chroman is contained especially when the polyol is a polyether, it has been found effective to use the 6-hydroxy-chromans in combination with organic esters of phosphorous acid such as triphenyl phosphite, tributyl phosphite, tri-dipropylene glycol-phosphite, tris-chloroethyl phosphite and the like or with esters of phosphines such as triphenyl phosphine and the like or with esters of sulphides such as bis (βcarbalkoxyethyl) sulphide and so on. These esters of phosphorous acid, phosphines or sulphides are used in an amount of 0.01 to 5% by weight, based on the weight of the reaction mixture, in addition to the 6 - hydroxychromans.

The stabilizers of this invention may be prepared by any suitable method including reacting hydroquinone or monoalkyl hydroquinones with dienes such as isoprene, butadiene, 2,3-dimethylbutadiene and the like in an organic solvent in the presence of catalytically active strong acids, e.g. 80 to 100% of orthophosphoric acid, polyphosphoric acid, 60 to 100% of sulphuric acid, p-toluene sulphonic acid or zinc chloride, preferably in the presence of 80 to 100% of orthophosphoric acid.

Any suitable solvent can be used in this process including, for example, benzene, toluene, xylene, chlorobenzene, cleaning petrol, chloroform, tetrachloroethylene, acetic acid, dioxane and the like and mixtures thereof. The reaction is carried out at temperatures of between about 20° and 120° C. When 80 to 100% of orthophosphoric acid is used, the temperatures are between 80° and 120° C. The reaction products are processed in the usual manner by suction filtration or distillation.

The principle of the reaction may be represented by the following reaction scheme using the reaction of hydroquinone with isoprene as an example:

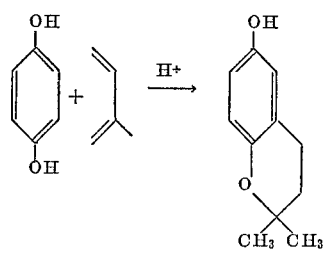

Derivatives which contain alkyl groups as substituents in the 7-position may also be prepared by reacting the 6-hydroxy-chromans obtained from hydroquinone and dienes with alkylating agents such as isobutylene, isoamylene, cyclopentene, cyclohexene, styrene and the like via the following reaction scheme:

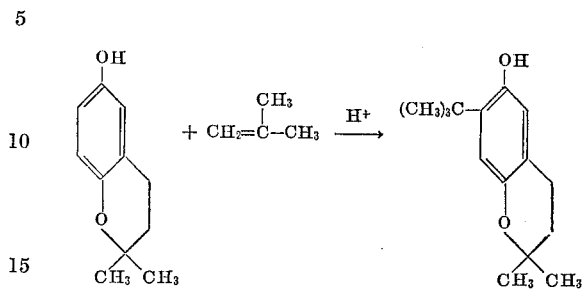

Some suitable 6-hydroxy-chromans which may be used in the process of the invention include, for example, 2-methyl-6-hydroxy-chroman,
2,2-dimethyl-6-hydroxy-chroman,
2,2,3-trimethyl-6-hydroxy-chroman,
2,2-dimethyl-7-tertiary-butyl-6-hydroxy-chroman,
2,2-dimethyl-7-tertiary-amyl-6-hydroxy-chroman,
2,2-dimethyl-7-tertiary octyl-6-hydroxy-chroman,
2,2-dimethyl-7-cyclopentyl-6-hydroxy-chroman,
2,2-dimethyl-7-methyl-6-hydroxy-chroman,
2,2-dimethyl-7-(1-methyl-cyclohexyl)-6-hydroxy-chroman,
2,2-dimethyl-7-(2-phenylethyl)-6-hydroxy-chroman,
2,2-dimethyl-7-(2-methyl-2-phenylethyl)-6-hydroxy-chroman,
2,2-dimethyl-7-methyl-6-hydroxy-chroman,
2,2,3,4-tetramethyl-6-hydroxy-chroman and the like and mixtures thereof.

Any organic polyisocyanate may be used in the preparation of the polyurethane foams of this invention including, for example, hexamethylene diisocyanate, xylylene diisocyanates, phenylene diisocyanates, tolylene diisocyanates, chlorophenylene diisocyanates, diphenylmethane-4,4'-diisocyanates, naphthalene-1,5-diisocyanate, triphenylmethane - 4,4',4'' - triisocyanate, xylylene - α,α' - diisothiocyanate, any of those listed in U.S. Patent 3,350,362 and mixtures thereof and the like. Dimers and trimers of isocyanates and diisocyanates, biuret polyisocyanates, semicarbazide-, urea-, allophanate- or acylated biuret polyisocyanates prepared from the foregoing exemplary polyisocyanates as well as adducts which contain free NCO groups which are prepared by reacting an excess of an organic polyisocyanate such as those listed above with alcohols such as trimethylol propane, glycerol, hexane-1,2,6-triol, glycol, low molecular weight polyesters such as castor oil and any of those polyols listed in U.S. Patent 3,201,372. Furthermore, the reaction products of the above isocyanates with acetals as described in German Patent 1,072,385 and the isocyanates mentioned in German Patents 1,022,789 and 1,027,394 and any mixtures of the above compounds are also suitable. 2,4- and 2,6-tolylene diisocyanate and any mixtures of these isomers and polyphenyl-polymethylene polyisocyanates obtained by aniline formaldehyde condensation followed by phosgenation are especially preferred.

Any organic compounds which contain at least two hydrogen atoms reactive with NCO groups may be used to prepare the foams of this invention including any of those mentioned in U.S. Patent 3,201,372. Polyhydroxy polyethers and polyhydroxy polyesters are preferably used. Some suitable polyhydroxy polyethers include those having a molecular weight of from about 250 to about 5000. These compounds are preferably prepared by reacting alkylene oxides or alkylene oxide mixtures with suitable initiator molecules. Any desired alkylene oxides may be used and ethylene oxide, propylene oxide, 1,2-butylene oxide, 2,3-butylene oxide and 1,4-butylene oxide are preferably employed. Any preferably low molecular weight, desired compounds having at least two hydrogen atoms reactive with NCO groups are suitable for use as initiator molecules, e.g. water, ethylene glycol, propane-1,2-diol, propane-1,3-diol, glycerol, trimethylol propane, hexane-1,2,6-triol, pentaerythritol, sorbitol, cane sugar, polyhydroxybenzenes, polyhydroxy naphthalenes, polyhydroxy anthracenes, poly-(hydroxy-aryl) alkanes and the like as well as any listed in U.S. Pat. 3,201,372. Low molecular weight compounds are preferably employed. Addition products of alkylene oxides with phenol resins which contain hydroxyl groups, e.g. novolaks and similar compounds, are also suitable. Primary diamines and polyamines such as ethylene diamine, 1,3-propylene diamine, 1,4-butylene diamine, diaminobenzenes, triaminobenzenes and secondary diamines and polyamines such as N,N'-dimethylethylene diamine, N,N'-dimethylpropylene diamine, N,N'-dimethyl-diaminobenzene, N,N',N''-trimethyltriaminobenzene and similar compounds including any listed in U.S. Patent 3,201,372 may also be used as suitable initiator molecules for the reaction with alkylene oxides. The polyhydroxy polyethers may also be used in admixture with the monomeric initiator molecules.

Any suitable polyhydroxy polyesters can be used to prepare the foam of this invention and those having a hydroxyl equivalent weight of 100 to 3000 in which the hydroxyl equivalent weight is the quantity of polyester in grams which contains 1 mol of hydroxy groups are preferred. The polyhydroxy polyesters are prepared by reacting polycarboxylic acids or their anhydrides with polyvalent hydroxyl compounds. Any suitable polycarboxylic acids may be used including, for example, oxalic acid, succinic acid, glutaric acid, adipic acid, pimelic acid, maleic acid, fumaric acid, phthalic acid, terephthalic acid, dimerized fatty acids and the like. Any suitable polyvalent polyhydroxyl compounds may be used including, for example, ethylene glycol, diethylene glycol, triethylene glycol, polyethylene glycols, propylene glycol, dipropylene glycol, polypropylene glycols, butane-1,4-diol, butene-(2)-diol-1,4, glycerol, trimethylol propane, pentaerythritol, castor oil, hydroquinone, 4,4'-dihydroxydiphenylmethane, 4,4'-dihydroxydiphenylpropane and the like. In the preparation of the polyhydroxy polyesters, it is preferred to react dicarboxylic acids with divalent hydroxyl compounds. Tricarboxylic acids or polycarboxylic acids as well as higher functional polyhydroxyl compounds may also be used in the preparation of the polyhydroxy polyesters.

Any tertiary amine may be used to catalyze the polyaddition reaction including any of those listed in U.S. Patents 2,948,928, 2,941,967, 2,948,691, 3,201,372 and the like. The quantity of tertiary amine which may be used generally varies between about 0.001 and 10% by weight, based on the quantity of the polyol employed and depends on the molecular weight and the structure of the polyol component, of the amine and the isocyanate. The tertiary amines may also contain active hydrogen atoms.

Typical tertiary amines which are practically unreactive with isocyanate groups include inter alia triethylamine, tributylamine, N-methyl-morpholine, N-ethyl-morpholine, N-cocomorpholines, N,N,N',N' - tetramethylethylene diamine, 1,4 - diaza - bicyclo - (2,2,2) - octane, N-methyl-N' - dimethylaminoethyl - piperazine, bis - [2-(N,N-dimethylamino) - ethyl] ether, N,N - dimethylbenzylamine, bis - (N,N-diethylaminoethyl) - adipate, N,N - diethylbenzylamine, pentamethyl-diethylene triamine, N,N - dimethyl - cyclo - hexylamine, N,N,N',N' - tetramethyl-1,3-butane diamine, N,N - dimethyl - β - phenylethylamine, 1,2 - dimethylimidazole, 2 - methylimidazole, sila-amines which contain carbon-silicon bonds as described in German Patent 1,229,290; 2,2,4-trimethyl-2-silamorpholine, 1,3-diethylaminomethyl-tetramethyl - disiloxane and the like and mixtures thereof.

Typical tertiary amines which contain hydrogen atoms reactive with isocyanate groups include, for example, triethanolamine, triisopropanolamine, N-methyl - diethanolamine, dimethyl - ethanolamine and their reaction products with alkylene oxides such as propylene oxide and/or ethylene oxide and the like and mixtures thereof.

Bases which contain nitrogen, such as tetraalkylammonium hydroxides, and alkalies, alkali metal phenolates or alkali metal alcoholates such as sodium methylate or hexahydrotriazines may also be used as catalysts instead of or in addition to the amines.

Organic metal compounds, especially organo-tin compounds may be used as additional catalysts to accelerate the isocyanate-polyol reaction, especially to accelerate the reaction between polyether polyols and isocyanate.

Tin compounds which are particularly important are the stannous acylates such as tin-II-octoate, tin-II-ethylhexoate, tin-II-versatate (tin salt of highly branched synthetic fatty acids), tin-II-acetate, tin-II-laurate or the dialkyl tin salts of carboxylic acids such as dibutyl tin diacetate, dibutyl tin dilaurate, dibutyl tin maleate, dioctyl tin diacetate and the like.

Water or liquefied halogenated carbon compounds are used as blowing agents either alone or in combination with one another. Liquefied halogenated carbon compounds include saturated, aliphatic hydrocarbons which are at least partly halogenated and which evaporate at or below the temperature used for foam formation. Preferred compounds are methylene chloride, chloroform, trichlorofluormethane, dichlorodifluoromethane, and any of the blowing agents listed in U.S. Patent 3,201,372. Additives for regulating the pore size and cell structure and emulsifiers may also be used although they are not always necessary. In addition, fillers, dyes and plasticizers may be used in the production of the foam.

The polyurethane foams of this invention can be produced by any of the known one-stage, semi-prepolymer or prepolymer processes either at room temperature or at an elevated temperature. It is sometimes advantageous to use a mechanical apparatus for this purpose and any suitable apparatus as described e.g. in French Pat. 2,074,713 or U.S. Reissue 24,514 may be employed.

The foam resins produced via the process of the invention are suitable for any purposes for which polyurethane foams have previously been used, e.g. for the production of upholstery, as heat insulation, sound insulation, textile coating, packaging, in the production of structural elements and so on.

The invention is further illustrated but is not intended to be limited by the following examples in which all parts and percentages are by weight unless otherwise specified.

EXAMPLE 1

(a) Preparation of 2,2-dimethyl-6-hydroxy-chroman

About 222 parts (2 mols) of hydroquinone are suspended in a mixture of about 320 ml. of xylene and about 160 ml. of cleaning petrol. After the addition of about 15 ml. of 85% phosphoric acid and about 2 ml. of water, about 150 parts (2.2 mols) of isoprene are added dropwise at from about 98° to about 100° C. with vigorous stirring over the course of about 5 hours. Stirring is then continued for about 3.5 hours at about 98° to 100° C., the reaction mixture is cooled, the solution is decanted from the catalyst, the solvent is distilled off under vacuum and the oily residue is then distilled off. About 281 parts of a colorless, viscous oil which gradually solidifies, (B.P.$_{12mm.}$ 162–170° C.) are obtained as a crude product. The crude product is purified by suspending it in 10% aqueous sodium hydroxide solution. The small amount of undissolved residue is removed by suction filtration and the filtrate is acidified with acetic acid. A colorless oil separates and gradually crystallizes. The crystals are removed by suction filtration and about 221 parts of 2,2-dimethyl- 6-hydroxy-chroman are obtained as colorless crystals which melt at about 73° C.

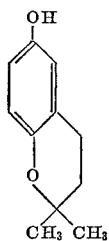

$C_{11}H_{14}O_2$ (molecular weight 178.2).—Calculated (percent): C, 74.2; H, 7.9; O, 18.0. Found (percent): C, 74.1; H, 8.0; O, 17.9%.

(b) Oxidation

About 0.1 part of 2,2-dimethyl-6-hydroxy-chroman prepared as described above is dissolved in about 100 parts of a linear polypropylene glycol having an hydroxyl number of 112 and the oxygen uptake is measured at about 150° C. An induction time of about 265 minutes is found whereas, in the case of the polyether not containing the stabilizer of this invention, an induction time of one minute is found at the same tempearture. The induction time is the time during which the substrate is protected against oxidation. Uptake of oxygen takes place only after this time. The longer the induction time, the more effective is the stabilizer against oxidation. The induction time is determined manometrically in a Warburg apparatus.

(c) Preparation of a polyurethane foam

A soft polyurethane foam is prepared from about 100 parts of a branched polyether prepared from glycerol and propylene oxide and ethylene oxide and having 63% of terminal primary hydroxyl groups (hydroxyl number 32), about 6 parts of water, about 0.2 part of triethylene diamine, about 2 parts of a water-soluble polyether-polysiloxane, about 0.1 part of tin-II-octoate and about 65 parts of tolylene diisocyanate (65% 2,4- and 35% 2,6-isomer).

The foam has a brown discoloration in the interior. In a second experiment, about 0.15 part of 2,2-dimethyl-6-hydroxy-chroman is added either to the isocyanate or to the polyether. A soft polyurethane foam is obtained but it is white in the interior and has no discoloration in the core. The addition of the chroman compound does not effect any deterioration of the physical properties of the foam.

EXAMPLE 2

(a) Preparation of 2-methyl-6-hydroxy-chroman

This compound is prepared exactly as described in Example 1(a) (same molar amounts are applied) except that hydroquinone is reacted with butadiene to get a colorless viscous oil that boils (12 mm.) at 160°–162° C.

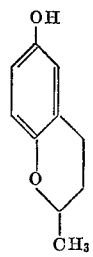

(b) Oxidation

About 0.1 part of 2-methyl-6-hydroxy-chroman is dissolved in about 100 parts of linear polypropylene glycol having an hydroxyl number of 112 (molecular weight 1000) and the oxygen uptake is measured at about 150° C. The induction time is found to be 314 minutes, whereas for the polyether prepared without the stabilizer of this invention, the induction time is found to be 1 minute at the same temperature.

(c) Discoloration test

When air at about 130° C. is passed for about 6 hours through a solution of about 0.1 part of 2-methyl-6-hydroxy-chroman in about 100 parts of a linear polypropylene glycol having an hydroxyl number of 112 (molecular weight 1000), the polyether discolors to a light brownish color. The same solution of about 0.1 part of 2-methyl-6-hydroxy-chroman and linear polyether does not undergo discoloration under the same conditions if about 0.5% of triphenyl phosphite is added to the solution.

(d) Preparation of a polyurethane foam

About 100 parts of a branched polyether prepared from glycerol and propylene oxide and ethylene oxide and having 63% of terminal primary hydroxyl groups (hydroxyl number 32) are reacted with about 6 parts of water, about 0.2 part of triethylene diamine, about 2 parts of a water-soluble polyether polysiloxane, about 0.1 part of tin-II-octoate and about 65 parts of tolylene diisocyanate (65% 2,4- and 35% 2,6-isomer) to produce a soft polyurethane foam. The foam has a brown discoloration in the interior. In another experiment, about 0.25 part of 2-methyl-6-hydroxy-chroman is added either to the isocyanate or to the polyether. A foam having the same good physical properties is obtained but it is white in the interior and has no discoloration in the core.

EXAMPLE 3

(a) Preparation of 2,2,3-trimethyl-6-hydroxy-chroman

This compound is prepared as described in Example 1(a) by reacting hydroquinone with 2,3-dimethyl-butadiene to get colorless crystals having a melting point of 72° to 73° C.

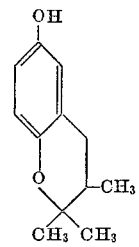

(b) Oxidation

About 0.1 part of 2,2,3-trimethyl-6-hydroxy-chroman is dissolved in about 100 parts of a linear polypropylene glycol having an hydroxyl number of 112 (molecular weight 1000) and the oxygen uptake is measured at about 150° C. The induction time is found to be 204 minutes, whereas for the polyether without the stabilizer of this invention, the induction time is 1 minute at the same temperature.

(c) Discoloration test

If air at a temperature of about 130° C. is passed through a solution of about 0.1 part of 2,2,3-trimethyl-6-hydroxy-chroman in about 100 parts of a linear polypropylene glycol (molecular weight 1000) for about 6 hours, the polyether has a yellow brown color. The same solution of about 0.1 part of 2,2,3-trimethyl-6-hydroxy-chroman and linear polyether does not undergo discoloration under the same conditions if about 0.5 part of triphenyl phosphite is added.

EXAMPLE 4

(a) Preparation of 2,2-dimethyl-7-tertiary butyl-6-hydroxy-chroman

About 178 parts (1 mol) of 2,2-dimethyl-6-hydroxy-chroman are disoslved in about 500 ml. of toluene. After the addition of about 2 ml. of concentrated sulphuric acid, about 112 parts (2 mols) of isobutylene are passed through at about 75° C. with vigorous stirring. Stirring is continued for about 3 hours at about 75° C., about 500 ml. of light petrol are added and the reaction mixture is then cooled and the product removed by suction filtration. After washing the product with toluene and light petrol (1:1) and water and drying at 50° to 60° C., about 170 parts of 2,2-dimethyl-7-tertiary butyl-6-hydroxy-chroman are obtained as colorless crystals having a melting point of about 186° C.

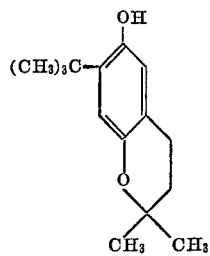

$C_{15}H_{22}O_2$ (molecular weight 234).—Calculated (percent): C, 76.8; H, 9.5; O, 13.7. Found (percent): C, 76.28; H, 9.45; O, 14.41.

(b) Oxidation

About 0.1 part of 2,2-dimethyl-7-tertiary butyl-6-hydroxy-chroman is dissolved in about 100 parts of a linear polypropylene glycol having an hydroxyl number 112 (molecular weight 1000) and the oxygen uptake is measured at about 150° C. The induction time is greater than 330 minutes, whereas for the polyether without the stabilizer of this invention, the induction time at the same temperature is 1 minute.

(c) Preparation of polyurethane foam

About 100 parts of a branched polyether prepared from glycerol and propylene oxide and ethylene oxide having 63% of terminal primary hydroxyl groups (hydroxyl number 32) are reacted with about 6 parts of water, about 0.2 part of triethylene diamine, about 2 parts of a water-soluble polyether polysiloxane, about 0.1 part of tin-II-octoate and about 65 parts of tolylene diisocyante (65% of 2,4- and 35% of 2,6-isomer) to produce a soft polyurethane foam with good physical properties but a brown discoloration in the interior.

After the addition of about 0.05 part of 2,2-dimethyl-7-tertiary butyl-6-hydroxy-chroman, a soft polyurethane is obtained which has the same good physical properties but no discoloration in the core.

About 100 parts of a slightly branched polyester obtained by the condensation of adipic acid with diethylene glycol and trimethylol propane (molecular weight 2500, hydroxyl number 60) are reacted with about 5 parts of water, about 0.8 part of dimethylbenzylamine, about 2 parts of sodium castor oil sulphate (50% by weight water) and about 1 part of tolylene diisocyanate (65% of 2,4- and 35% of 2,6-isomer) to produce a soft polyurethane foam. The foam has good physical properties and a lemon yellow discoloration in the interior. After the addition of about 0.1 part of 2,2-dimethyl-7- tertiary butyl-6-hydroxy-chroman, the same excellent polyester polyurethane foam is obtained having no discoloration in the core.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Polyurethane foams free from discoloration prepared by a process which comprises reacting organic polyisocyanates with organic compounds containing at least two hydrogen atoms reactive with NCO groups in the presence of a blowing agent and an effective amount of a 6-hydroxy-chroman to prevent discoloration, the 6-hydroxy-chroman having the formula

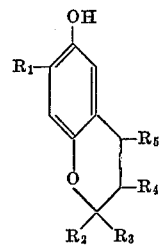

wherein $R_1$ is a hydrogen atom or an alkyl, cycloalkyl or aralkyl radical containing from one to nine carbon atoms and $R_2$, $R_3$, $R_4$ and $R_5$ are hydrogen or lower alkyl groups having one to four carbon atoms.

2. The polyurethane foam of claim 1 wherein the 6-hydroxy-chroman has the formula

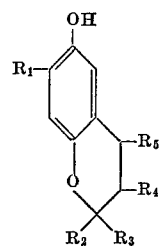

wherein $R_1$ is a hydrogen atom or an alkyl, cycloalkyl or aralkyl radical containing from one to nine carbon atoms and $R_2$, $R_3$, $R_4$ and $R_5$ are hydrogen or methyl.

3. The polyurethane foam of claim 1 wherein the 6-hydroxy-chroman is present in an amount of 0.001 to 5% by weight based on the weight of the reaction mixture.

4. The polyurethane foam of claim 1 wherein the 6-hydroxy-chroman is present in an amount of 0.02 to 3% by weight based on the weight of the reaction mixture.

5. The polyurethane foam of claim 1 wherein the 6-hydroxy-chroman is 2-methyl-6-hydroxy-chroman,
2,2-dimethyl-6-hydroxy-chroman,
2,2,3-trimethyl-6-hydroxy-chroman,
2,2-dimethyl-7-tertiary butyl-6-hydroxy-chroman,
2,2-dimethyl-7-tertiary amyl-6-hydroxy-chroman,
2,2-dimethyl-7-tertiary octyl-6-hydroxy-chroman,
2,2-dimethyl-7-cyclopentyl-6-hydroxy-chroman,
2,2-dimethyl-7-cyclohexyl-6-hydroxy-chroman,
2,2-dimethyl-7-(1-methyl-cyclohexyl)-6-hydroxy-chroman,
2,2-dimethyl-7-(2-phenylethyl)-6-hydroxy-chroman,
2,2-dimethyl-7-(2-methyl-2-phenylethyl)-6-hydroxy-chroman,
2,2-dimethyl-7-methyl-6-hydroxy-chroman,
2,2,3,4-tetramethyl-6-hydroxy-chroman and mixtures thereof.

6. A process for preparing the polyurethane foam of claim 1 which comprises reacting organic polyisocyanates with organic compounds containing at least two hydrogen atoms reactive with NCO groups in the presence of a blowing agent and an effective amount of a 6-hydroxychroman to prevent discoloration, the 6-hydroxy-chroman having the formula

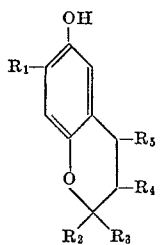

wherein $R_1$ is a hydrogen atom or an alkyl, cycloalkyl or aralkyl radical containing from one to nine carbon atoms and $R_2$, $R_3$, $R_4$ and $R_5$ are hydrogen or lower alkyl groups having one to four carbon atoms.

References Cited

UNITED STATES PATENTS

| | | | |
|---|---|---|---|
| 3,151,098 | 9/1964 | Watson | 260—45.9 |
| 3,429,837 | 2/1969 | Langrish et al. | 260—2.5 |
| 3,148,163 | 9/1964 | Freyermuth | 260—2.5 |
| 3,476,772 | 11/1969 | Hoyle et al. | 260—345.5 |
| 3,528,933 | 9/1970 | Johnson | 260—2 |
| 3,476,777 | 11/1969 | Murakami et al. | 260—345.5 |

DONALD E. CZAJA, Primary Examiner

H. S. COCKERAM, Assistant Examiner

U.S. Cl. X.R.

260—45.8 A, 77.555, 611.5